(12) United States Patent
Liu et al.

(10) Patent No.: US 9,697,026 B1
(45) Date of Patent: Jul. 4, 2017

(54) HIGH AVAILABILITY SERVICE VIRTUAL MACHINE IN VIRTUALIZATION ENVIRONMENT

(71) Applicants: Hao Liu, Ottawa (CA); Zhen Liu, Ottawa (CA)

(72) Inventors: Hao Liu, Ottawa (CA); Zhen Liu, Ottawa (CA)

(73) Assignee: TREND MICRO INC., Tokyo (JP)

( * ) Notice: Subject to any disclaimer, the term of this patent is extended or adjusted under 35 U.S.C. 154(b) by 266 days.

(21) Appl. No.: 14/517,047

(22) Filed: Oct. 17, 2014

(51) Int. Cl.
G06F 9/455 (2006.01)
G06F 3/06 (2006.01)
H04L 29/08 (2006.01)

(52) U.S. Cl.
CPC .................. G06F 9/45533 (2013.01)

(58) Field of Classification Search
CPC ............ G06F 9/45558; G06F 9/45533; G06F 2009/45587; G06F 21/53; G06F 2009/45579; G06F 2009/45595
See application file for complete search history.

(56) References Cited

U.S. PATENT DOCUMENTS

| | | | |
|---|---|---|---|
| 7,984,108 B2 * | 7/2011 | Landis | G06F 9/5016 709/213 |
| 9,191,454 B2 * | 11/2015 | Fries | H04L 67/2861 |
| 9,208,015 B2 * | 12/2015 | Vavrick | G06F 11/0793 |
| 9,253,109 B2 * | 2/2016 | Koponen | G06F 9/45558 |
| 2013/0064133 A1 * | 3/2013 | Ritz | G06F 9/4555 370/254 |
| 2015/0370592 A1 * | 12/2015 | Tuch | G06F 9/45558 718/1 |

OTHER PUBLICATIONS

Xiao et al., A covert channel construction in a virtualized environment, Oct. 2012, 3 pages.*
Okamura et al., Load-based covert channels between Xen virtual machines, Mar. 2010, 8 pages.*
Zhang et al., Cross-VM side channels and their use to extract private keys, Oct. 2012, 12 pages.*

* cited by examiner

*Primary Examiner* — Thuy Dao
(74) *Attorney, Agent, or Firm* — Beyer Law Group LLP (57) ABSTRACT

A service virtual machine provides service to any number of virtual machines on a hypervisor over a first communication channel. When an anomaly is detected within the provided service, any virtual machine using the first communication channel switches to a second communication channel and receives service from a second virtual machine. The second virtual machine may execute upon the same computer or on a different computer. Hooking points within the hypervisor provide a means for the service virtual machines to monitor traffic and provide service to the protected virtual machines. When a service virtual machine is suspended, it is repopulated, upgraded or rebooted, and then restored to service. Once restored, any protected virtual machine may be switched back to the restored service virtual machine. Virtual machines may be switched to a different communication channel by modifying a configuration file. Both communication channels may be in use at the same time.

15 Claims, 7 Drawing Sheets

```
C:\Users\hao_liu\Desktop\Hao-Win81Test.vmx - Notepad ++
File Edit Search View Encoding Language Settings Macro Run Plugins Window ?
Hao-Win81Test.vmx
 83  pciBridge6.functions = "6"
 84  pciBridge7.present = "true"
 85  pciBridge7.virtualDev = "pciRootPort"
 86  pciBridge7.functions = "6"
 87  vmci0.unrestricted = "true"
 88  chipset.onlineStandby = "FALSE"
 89  sched.cpu.min = "0"
 90  sched.cpu.shares = "normal"
 91  sched.mem.min = "0"
 92  sched.mem.minSize = "0"
 93  sched.mem.shares = "normal"
 94  migrate.hostlog = "./Hoa-Win81Test-b0196a4f.hlog"
 95  sched.swap.derivedName = "/vmfs/volumes/574c40d-c4163fc5-483t-005056a94660/Hao
 96  vuid.location = "56 4d cf 2d d1 08 c8-fn eb 13 t9 7c d5 78 d3"
 97  replay.filename = ""
 98  scsi0:0.redo = ""
 99  vmci0.id = "-1228857018"
100  cleanShutdown = "FALSE"
101  ethernet0.filter0.name = "dvfilter-dsa"
102  ethernet0.filter0.onFailure = "failopen"
103  ethernet0.filter0.param0 = "423a26a7-378b-6as5-2617-c3b7b6c12146"
104  ethernet0.filter0.param2 = "1"
105  ethernet0.filter0.param1 = "00:50:56:BA:04:CB"
Normal text file    length: 3628  line: 10 Ln:1 Col:1 Sel:0:0    UNIX   UTF 8w/o BOI
```

*FIG. 6*

Configuration File

HIGH AVAILABILITY SERVICE VIRTUAL MACHINE IN VIRTUALIZATION ENVIRONMENT

FIELD OF THE INVENTION

The present invention relates generally to virtualization environments. More specifically, the present invention relates to increasing the availability of a service virtual machine within such an environment.

BACKGROUND OF THE INVENTION

As known in the art, any number of virtual machines may be executing upon a hypervisor upon a host computer. A service (or security) virtual machine is used to provide protection for any of the other virtual machines executing upon the host computer. But, only a single communication channel is used between the hypervisor and the service virtual machine in prior art architectures. If there is a problem with either the service virtual machine or with the communication channel then the performance of the other virtual machines will be reduced or halted. For example, the service virtual machine may be performing as a gateway, as an anti-malware device, or as a firewall. Because there is only one service virtual machine, there is a single point of failure which is undesirable.

Additionally, a separate problem might occur within the communication channel itself. Because the communication channel includes different components, should one component fail then a virtual machine is prevented from communicating with the service virtual machine. Thus, it would be desirable to reduce the downtime associated with failure of the service virtual machine or of its communication channel.

SUMMARY OF THE INVENTION

To achieve the foregoing, and in accordance with the purpose of the present invention, a technique is disclosed that eliminates a single point of failure in such a virtualization environment, thus enabling the environment to always have a service virtual machine available for use.

In a first embodiment, a service virtual machine provides any of a number of services to one or more protected virtual machines running on a hypervisor. If an anomaly is detected within the service virtual machine, within any of the services, or on the communication channel, then a management module within the computer receives notice of the anomaly. Because service could be degraded to the protected virtual machine, the module instructs any virtual machines using the communication channel to switch to a second communication channel. A second service virtual machine uses the second communication channel to then provide any needed services to the protected virtual machine.

In a second embodiment, a service virtual machine provides any of a number of services to one or more protected virtual machines running on a hypervisor on a host computer. If an anomaly is detected within the service virtual machine, within any of the services, or on the communication channel, then a management module receives notice of the anomaly. Because service could be degraded to the protected virtual machine, the module instructs any virtual machines using the communication channel to switch to a second communication channel. A second service virtual machine present on a different host computer uses the second communication channel to then provide any needed services to the protected virtual machine.

In a third embodiment, a service virtual machine which has been suspended from service is later restored to service. Once suspended, any protected virtual machines that had been using the service virtual machine are switched to a different communication channel where they then receive services via a different service virtual machine. The suspended service virtual machine is restored to service (e.g., by repopulating, by upgrading, by rebooting, etc.) and then any protected virtual machine may be switched back to the original communication channel in order to receive services from the previously suspended service virtual machine.

BRIEF DESCRIPTION OF THE DRAWINGS

The invention, together with further advantages thereof, may best be understood by reference to the following description taken in conjunction with the accompanying drawings in which:

FIG. 6 illustrates one example of such a configuration file for a protected virtual machine.

DETAILED DESCRIPTION OF THE INVENTION

As known in the art, a virtualization environment includes a virtualization platform, also known as a hypervisor, which executes on a computer processor such as x86, x86-64, Itanium, Power PC, ARM or other processor. The hypervisor is a piece of computer software, firmware, or hardware that creates and runs distinct operating systems at once. The virtualization platform may run directly on hardware and becomes the interface for hardware requests such as CPU, I/O, and disk for the various operating systems executing upon it. By separating these operating systems from the computer hardware, the hypervisor is able to run multiple operating systems securely and independently. Examples of hypervisors are: the Xen hypervisor available from Citrix Systems, Inc., the ESXI and vSphere hypervisors available from VMware, the Hyper V Server hypervisor available from Microsoft Corporation, and the KVM hypervisor in Linux available from Red Hat.

And, as is known in the art, a virtual machine is a software implementation of a machine that is able to execute programs like a physical machine. A virtual machine is typically installed on top of one of the operating systems running on a hypervisor. Virtual machines are known by various names based on their use. A system virtual machine may provide a complete system platform for the execution of a complete operating system. A process virtual machine may be designed to run a single process and is also called an application virtual machine (running as a normal application inside a host operating system). One characteristic of a virtual machine is that the software running inside it is limited to those resources and abstractions defined by the virtual machine such that the software cannot break out of its virtual environment.

Figure 1:
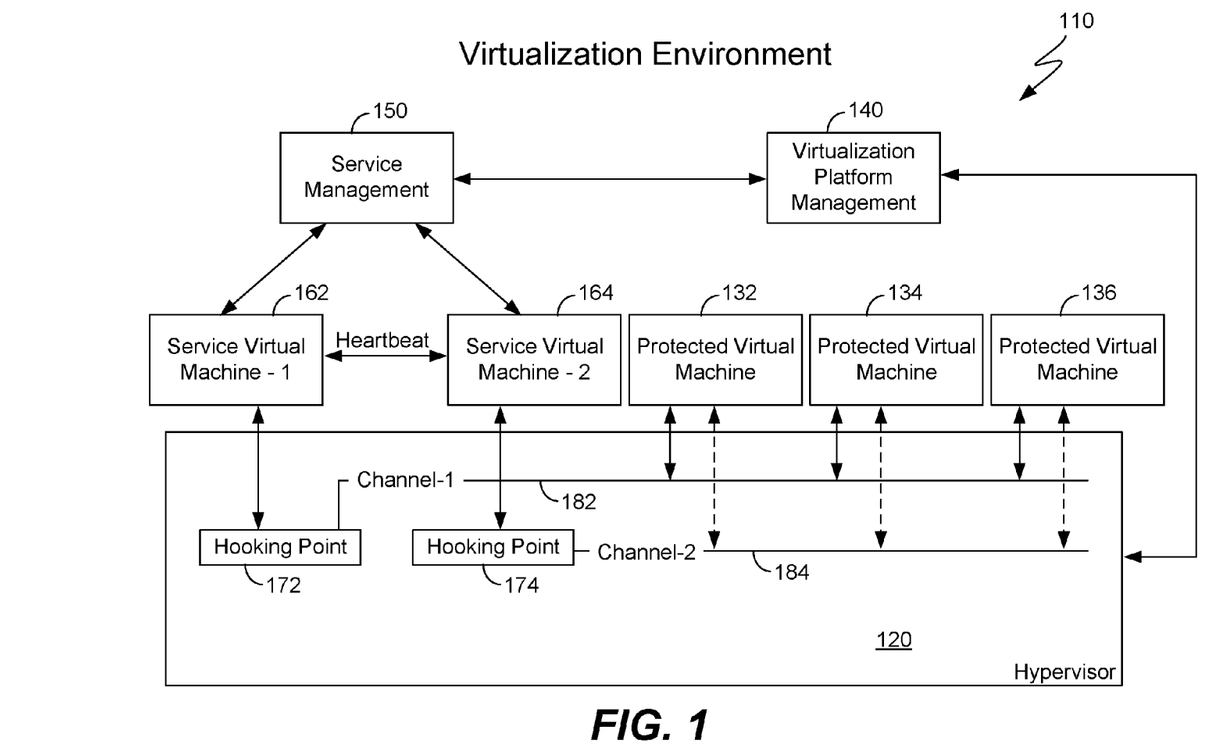
FIG. 1 illustrates a virtualization environment that may be executing upon a host computer.

FIG. 1 illustrates a virtualization environment 110 that may be executing upon a host computer (not shown). Executing upon the processor of the host computer is any suitable hypervisor 120, such as any of the hypervisors mentioned above. The hypervisor supports any number of virtual machines 132-136 which receive protection and services via the service virtual machines 162 and 164. As mentioned earlier, the service virtual machines may provide a firewall, packet inspection, anti-malware, etc. In the prior art, it was only possible for a single service virtual machine to communicate with the virtual machines on a single channel. In other words, it was not possible for two service virtual machines to share a single channel. As shown in FIG. 1, through the use of two communication channels 182 and 184, it is possible to add a second service virtual machine in order to reduce the downtime of any of the protected virtual machines.

In one specific example, the communication channels are implemented using a hypervisor available from VMware. For example, the technology known as VMsafe has APIs within the VMware hypervisor that allow a developer to implement advanced security products. The VMsafe technology itself is integrated into the VMware hypervisor. The VMsafe technology allows security products to view the operation of a virtual machine. Communication channel 182 is implemented using this VMsafe technology. A new product available from VMware, NSX technology, implements a hypervisor in which only a communication channel 184 based upon the NSX technology may be used. Nevertheless, for backwards compatibility, this new NSX technology also supports communication over communication channel 182 based upon VMsafe. Thus, FIG. 1 presents an innovative solution in which a hypervisor using NSX technology is used, but in which two communication channels are available for use. Service virtual machine 162 communicates with the virtual machines using channel 182 using the VMsafe technology, while service virtual machine 164 communicates with the virtual machines using channel 184 using the NSX technology.

Of course, use of two communication channels may also be achieved using other types of hypervisors. For example, a proprietary driver is hooked in a specific hypervisor to establish a communication channel, thus allowing for incoming connections from the service virtual machines. After this connection is established, any data destined for the protected virtual machines will be intercepted by the hooking function and forwarded to a service virtual machine. After the service virtual machines returns a "Pass" result (for example), that data will then be sent to the protected virtual machines. Similarly, any outbound data from the protected virtual machines will be hooked, sent to a service virtual machine, examined, and then allowed to continue if appropriate.

Hooking points 172 and 174 are preferably implemented using APIs that are exposed via the hypervisor. In the specific example of the hypervisor available from VMware, these hooking points provide access to kernel drivers; the APIs that are used are createFilter, destroyFilter, processPackets, and filtedoctlRequest. For other hypervisors (such as KVM and Xen) with "netfilter" built in, "br-netfilter" can be used to hook the traffic via the bridge, meaning both inbound to the protected virtual machines and outbound from the protected virtual machines. Some of those hooking points may be: NF_BR_PRE_ROUTING, NF_BR_FOWARD, etc.

Shown at 168 is a heartbeat signal sent between service virtual machines 162 and 164. This signal communicates information between the two service virtual machines such as tasks yet to be completed, operational status of each of the service virtual machines, which communication channel is in use with which protected virtual machine, etc.

Service management software module 150 is responsible for managing the two service virtual machines and communicates with each of them. This module also serves as a Web console, allows for different configurations, and allows settings to be specified for each service virtual machine. The settings will be pushed down to each service virtual machine. In one specific implementation, the virtualization environment 110 forms part of the Deep Security software product available from Trend Micro Inc., and service management 150 is implemented as the Deep Security manager. Virtualization platform management software module 140 is responsible for managing the protected virtual machines and the hypervisor. In one specific implementation, hypervisor 120 is the VMware ESXi software product and module 140 is implemented as a combination of the VMware VCenter and Vision Manager product modules.

In this example, shown is an "active-standby" environment in which all of the protected virtual machines use channel 182 in order to receive services and protection from service virtual machine 162 which is active. The protected virtual machines are not currently using channel 184 to communicate with service virtual machine 164 which is on standby.

Figure 2:
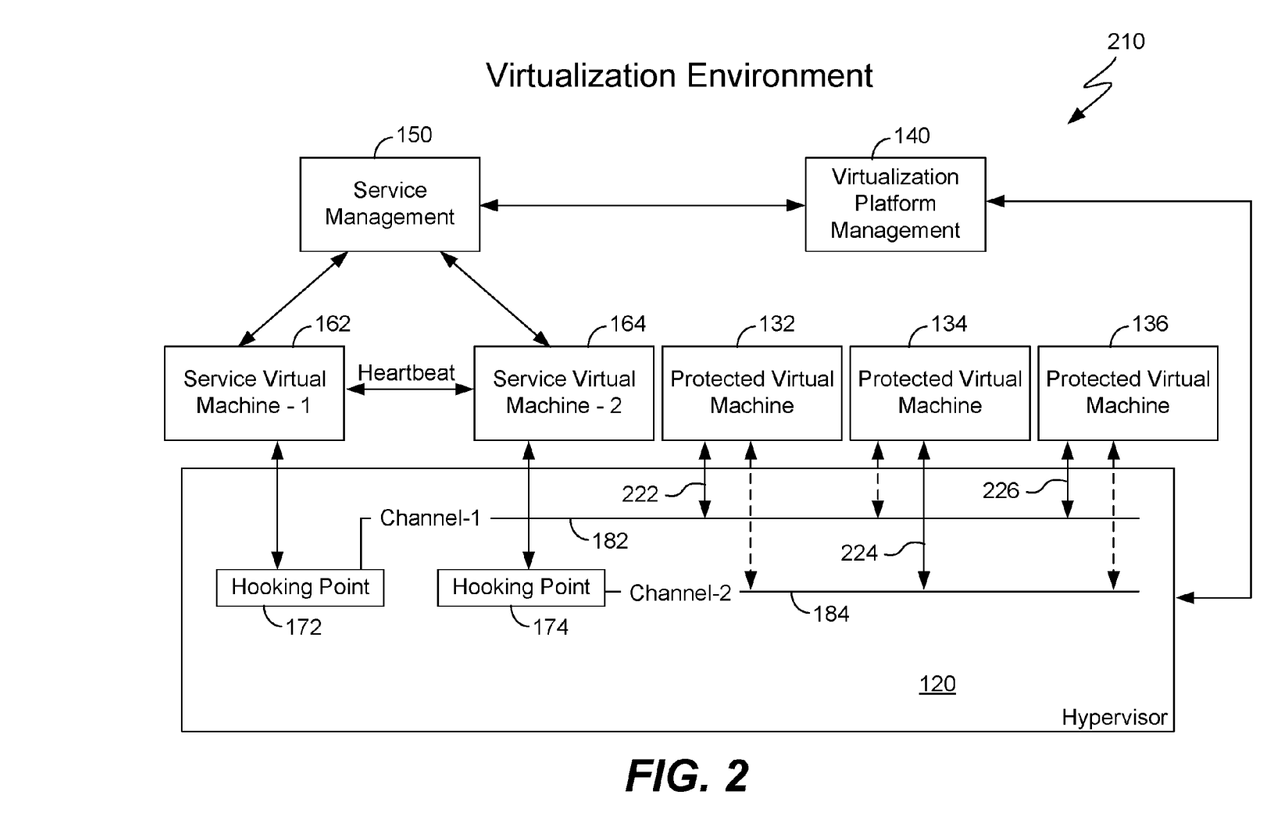
FIG. 2 illustrates a virtualization environment that may be executing upon a host computer.

FIG. 2 illustrates a virtualization environment 210 that may be executing upon a host computer (not shown). This figure is similar to FIG. 1 except that this figure shows an "active-active" environment in which service virtual machines 162 and 164 are actively protecting any number of the protected virtual machines. Virtual machines 132 and 136 are using channel 182, while virtual machine 134 is using channel 184 via link 224. In this fashion, both of the service virtual machines share the load of providing services and protecting the other virtual machines.

Figure 3:
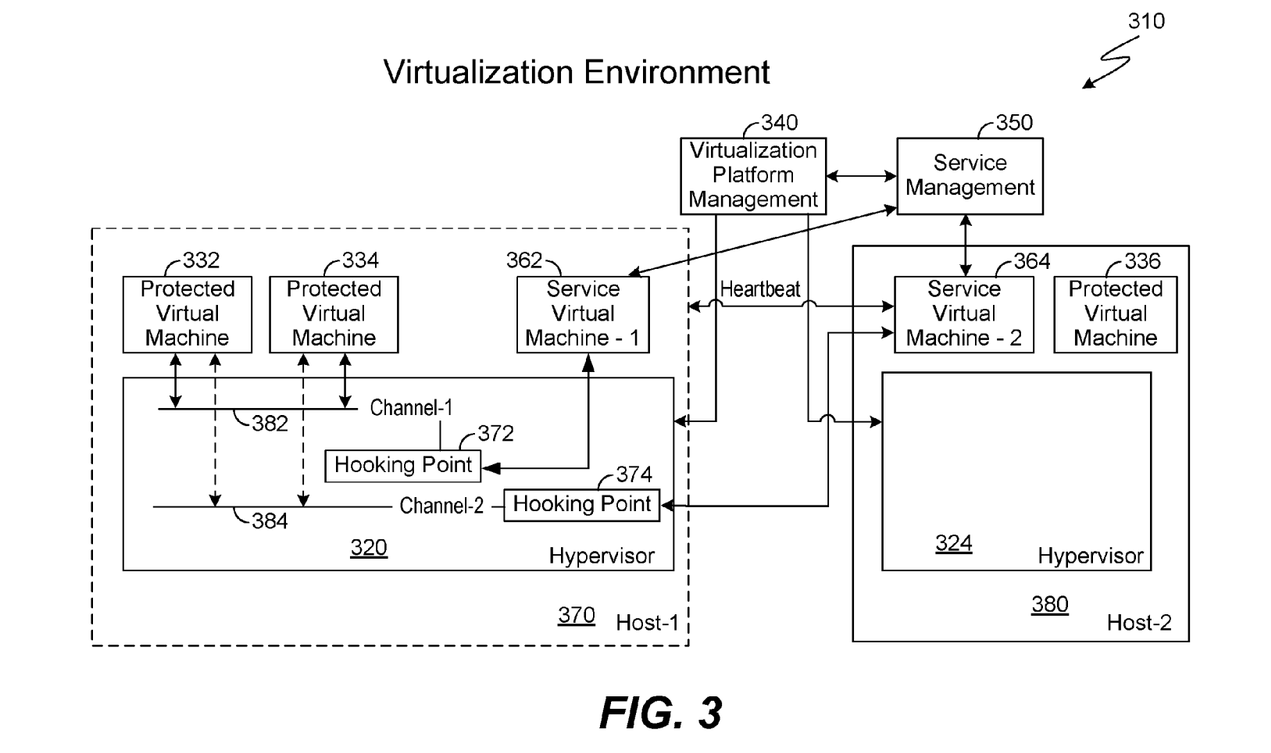
FIG. 3 illustrates a virtualization environment executing upon any number of host computers.

FIG. 3 illustrates a virtualization environment 310 executing upon any number of host computers. This environment typifies a cluster environment in which a user has implemented a cluster or clusters of host computers. Shown is host computer 370 that includes hypervisor 320 along with protected virtual machines and a service virtual machine 362. Host computer 380 includes hypervisor 324 along with protected virtual machines and service virtual machine 364. Virtualization platform management module 340 and service management module 350 are preferably implemented together upon a different host computer or implemented separately on different host computers. Heartbeat signal 368 provides the same communication and information as heartbeat 168 and is implemented between host computers using UDP datagrams.

In this environment, virtual machines 332 and 334 rely upon service virtual machine 362 for services and protection. Service virtual machine 364 on host computer 380 is on standby, ready to provide the same services and protection. In this environment, should service 362 fail, or should host computer 370 fail, then protection for any of the virtual machines on host computer 370 may be switched to channel 384 so that these virtual machines receive services and protection via the service virtual machine 364 on a different host computer. In one example, consider a situation in which the service virtual machine runs comprehensive checks on incoming data. Due to the complexity of the algorithm and unexpected input from the external world, the service may crash, hang, or fail to respond in a timely fashion. When the host 380 detects the failure of a heartbeat signal, it notifies the hook point to forward the data to itself, instead of to host 370. This transition is transparent to the protected virtual machines.

Flow Diagrams

Figure 4:
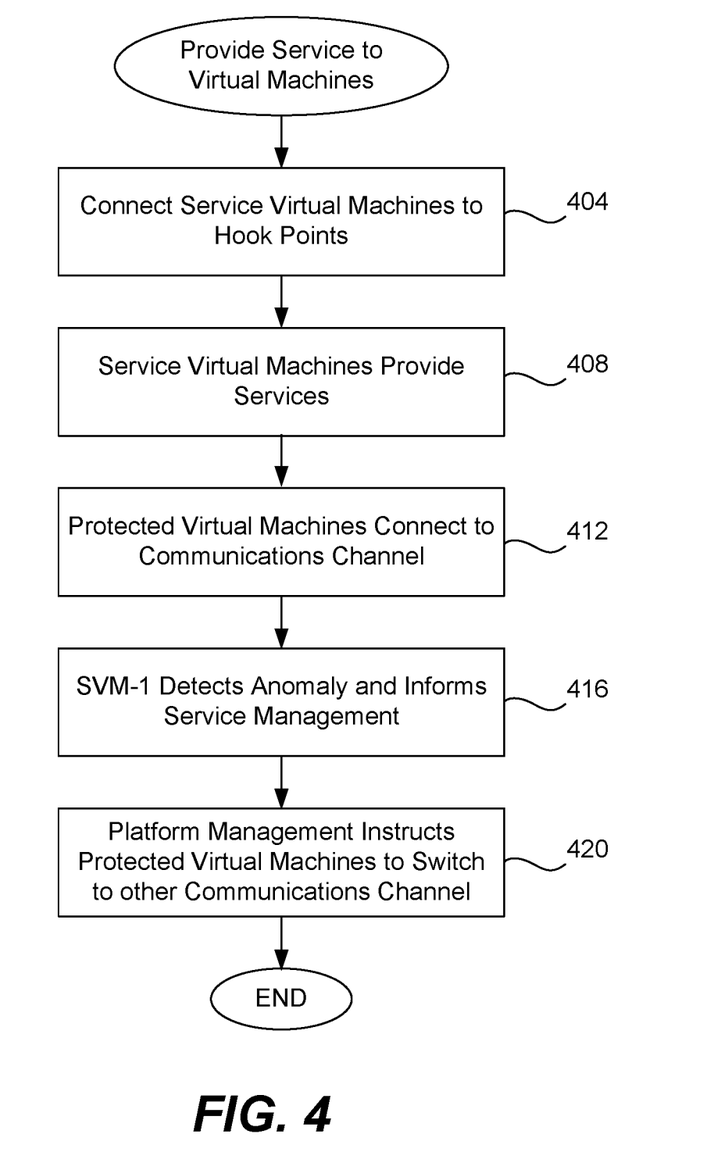
FIG. 4 is a flow diagram describing one embodiment by which services are provided to virtual machines.

FIG. 4 is a flow diagram describing one embodiment by which services are provided to virtual machines. This flow diagram is applicable to the environments shown in FIGS. 1-3 and the various options will be explained below. In step 404 the service virtual machines 162 and 164 connect to distinct hooking points within the hypervisor, for example, hypervisor 120. In the case of FIG. 3, service virtual machine 362 connects to hooking point 372 on the same computer, while service virtual machine 364 connects over an inter-computer connection 382 to hooking point 374 on a different computer. For example, the UDP protocol may be used to transfer the data between hooking point 374 and service virtual machine 364. Hooking point 374 intercepts the data inbound for and outbound from protected virtual machine 382, it then wraps the data into UDP datagrams and forwards to service virtual machine 364 for processing.

In step 408 service virtual machine 162 provides one or more services to protected virtual machines 132, 134 and 136. For example, all traffic from each protected virtual machine will pass through the service virtual machine via channel 182 and hooking point 172 so that the service virtual machine acts as a firewall. In addition, the service virtual machine may provide other Layer 2 and Layer 3 services. In another example, the service virtual machine provides Layer 4 protection by providing deep packet inspection (DPI); in this situation, only certain suspect packets would be sent to the service virtual machine for vulnerability detection and prevention. Or, the service virtual machine provides application layer protection for any of the protected virtual machines (any of Layers 5, 6 or 7) such as anti-malware protection. Also, the service virtual machine may provide data loss prevention (DLP). Depending upon the type of protection offered by the service virtual machine, all the traffic from the protected virtual machine may be routed through the service virtual machine or only a portion of that traffic may be routed. Traffic may include traffic between the protected virtual machine and the outside world and traffic within the protected virtual machine. In general, traffic from both external and internal sources may be routed; this is configurable.

In step 412 each of the protected virtual machines (for example, machines 132-136) connects to the communication channel 182. In one embodiment, by default, each virtual machine is always connected to both communication channels, but, service virtual machine 164 does not perform any services on traffic detected on channel 184 unless there is a failure with service virtual machine 162 and machine 164 is directed to perform services by platform management 140. In one implementation, both hooking points are in an active state. Hence, the protected virtual machines' traffic is visible at both hooking points.

In step 416 service virtual machine 162 detects an anomaly and informs service management 150. While the service virtual machine is performing services for any of the protected virtual machines via channel 182 it is possible: that an anomaly in the service will be detected, that it may be desirable to upgrade the service virtual machine, that the service virtual machine might fail, that the communication channel might fail, or that some other event will cause a deterioration in service. For example, the service virtual machine will constantly monitor its own memory usage, its CPU usage, and whether its various service processes are working properly. Because the goal is to provide a service virtual machine that has high availability and is functioning optimally for each of the protected virtual machines, a configurable threshold may be set for the above criteria. Any deterioration in the quality of service provided by the service virtual machine (as measured by a variety of factors including memory usage, CPU usage and functioning of its processes) may trigger the service virtual machine to report that an anomaly has been detected and that it should take itself out of service.

The service virtual machine may also monitor traffic passing through it; if it detects that no traffic is passing through it or if the traffic is halted (perhaps because of a communication channel problem) then the service virtual machine may report an anomaly. The connection table may also be monitored to ensure that it is working properly. A connection table tracks all inbound and outbound connections for both connection-oriented and connectionless traffic.

In another example, if it is desired to upgrade the service virtual machine, repopulate it, or reboot it, then the service virtual machine may also report that it should be removed from service temporarily. In each of these situations the service virtual machine will inform the service management module 150 that the protected virtual machines should be switched to the second channel 184. Additionally, should the service virtual machine crash unexpectedly, by default the service management module 150 or service virtual machine 164 will detect this crash (for example, by way of heartbeat signal 168) and will inform service management 150 that the protected virtual machines should switch channels.

Once service management 150 is informed or detects that service virtual machine 162 will no longer be in service, it then sends a command to virtualization platform 140 instructing it to switch the protected virtual machines from the first channel 182 to the second channel 184. Because both hooking points are always available, and because both communication channels are also available, management module 140 is able to instruct each protected virtual machine to switch to communication channel 184 in step 420.

Switching to a different communication channel may be accomplished in different manners depending upon the type of hypervisor in use. In one specific example, when a hypervisor from VMware is in use, the protected virtual machines are instructed to switch to a different communication channel by way of a configuration file. Module 140 modifies this file to reflect that channel 184 shall be used and then transfers this configuration file to each of the protected virtual machines so that they will begin using communication channel 184.

FIG. 6 illustrates one example of such a configuration file 610 for a protected virtual machine. In this example below, the lines within region 620 have been added or modified. When the hypervisor sees these changes, the traffic will be re-routed using the new channel 184. Of course, instructing the protected virtual machines to switch to a different communication channel may be accomplished in different manners when different hypervisors are used.

Figure 5:
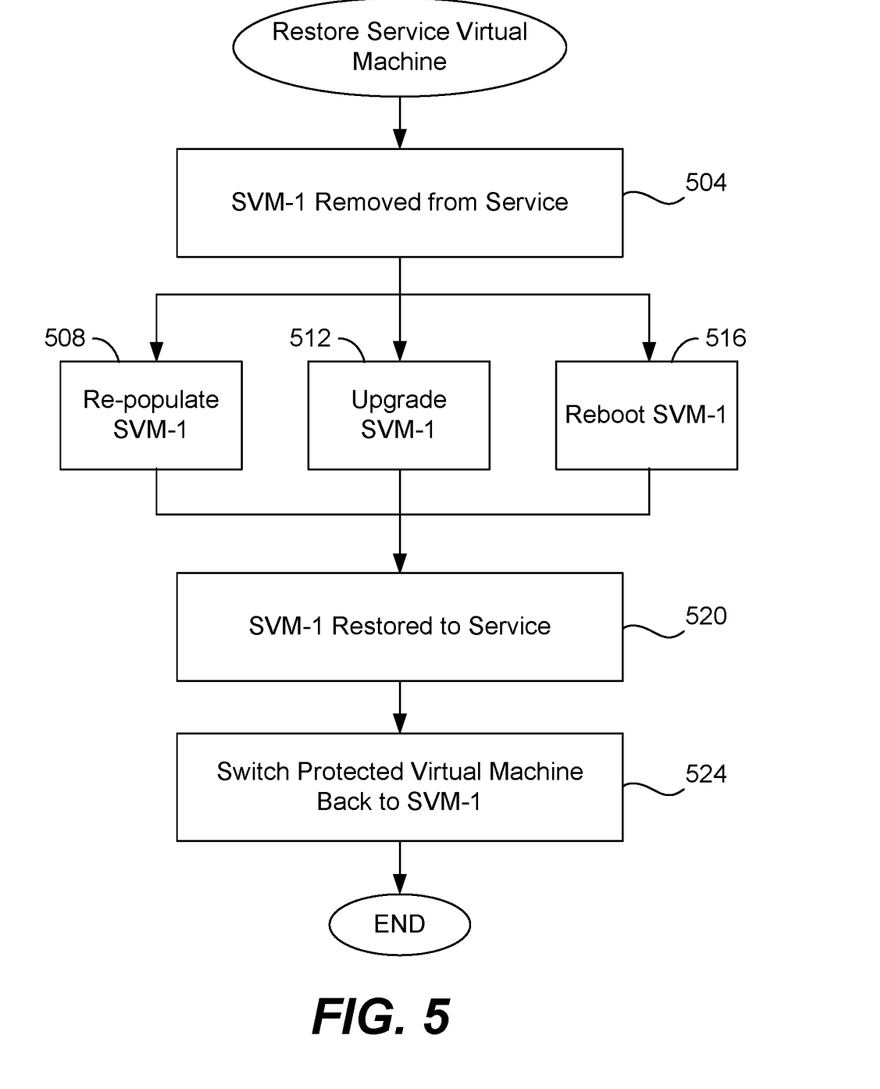
FIG. 5 is a flow diagram describing one embodiment by which a service virtual machine is restored to service.

FIG. 5 is a flow diagram describing one embodiment by which a service virtual machine is restored to service. As mentioned above in FIG. 4, it is possible in step 504 that a particular service virtual machine might be removed from service and that the protected virtual machines will begin using the communication channel of the other service virtual machine. If this happens, it will be desirable to restore the first virtual machine to service.

In step 508 if it has been determined that the first service virtual machine has been corrupted, then the first virtual machine is repopulated. In other words, a new first service virtual machine is deployed. This may be accomplished by deleting the existing configuration files of the first virtual machine and then creating a new first virtual machine having the same configuration. And, the service virtual machine can be deployed from a pre-configured template.

Alternatively, if the first service virtual machine has been removed from service because it needs to be upgraded, then step 512 is performed. The software for a virtual machine may need to be upgraded because the machine has a known bug, is suspected of having a bug, a new version of software is available, an upgrade or patch is available, etc. In this situation, the service virtual machine is upgraded to include a new version of software or a new build. Preferably, both the operating system is upgraded (in order to patch known vulnerabilities) and the applications running in the virtual machine are also upgraded.

On the other hand, it is possible that the service virtual machine needs to be rebooted or restarted. In this situation is not necessarily a service process executing within the virtual machine that is problematic, it is more likely that the operating system itself of the virtual machine is having a problem and it is believed that restarting the operating system will fix the problem. In step 516 the operating system of the first service virtual machine is restarted.

In step 520 the actions of any of steps 508-516 (or perhaps the actions of these steps combined) has been successful and the first service virtual machine is now restored to service and may be used. Since the protected virtual machines are now using the second communication channel, it is possible to keep these virtual machines on that communication channel and now place the first service virtual machine on standby. Alternatively, one or all of the protected virtual machines may now be switched back to using the services of the first service virtual machine by way of instructions from management module 140 as has been discussed above.

Computer System Embodiment

Figure 7A:
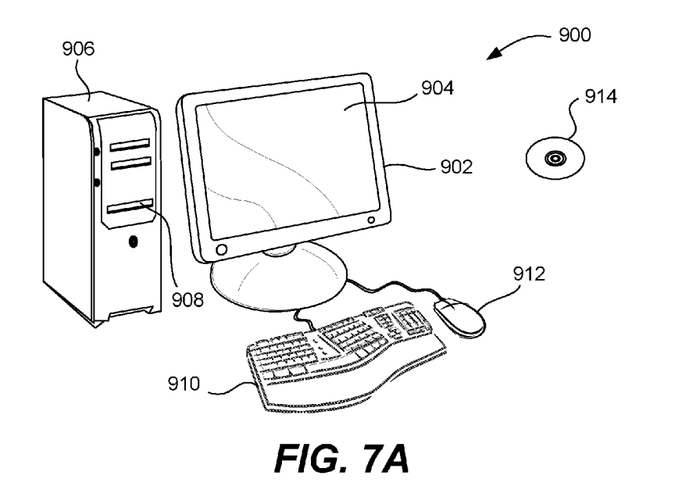
FIGS. 7A and 7B illustrate a computer system suitable for implementing embodiments of the present invention.
Figure 7B:
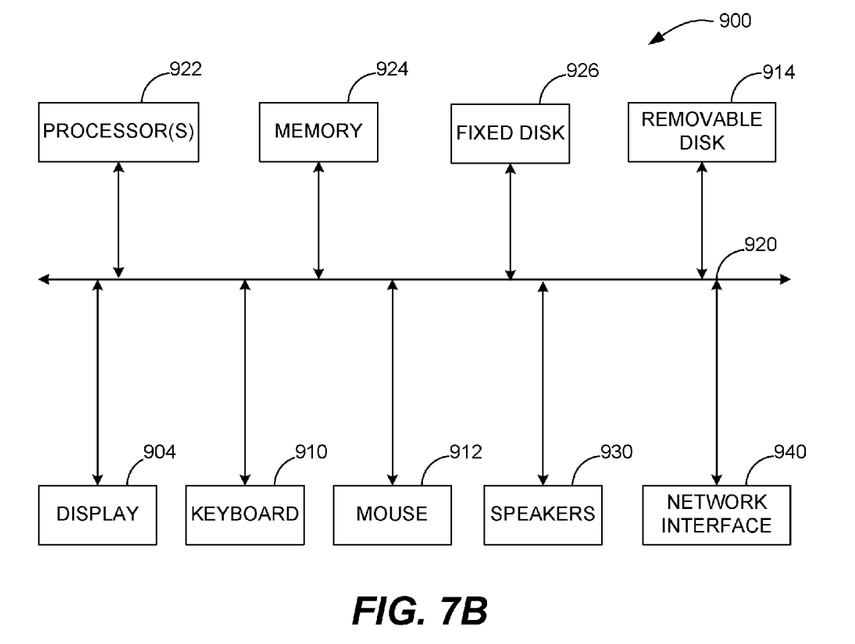

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:
1. In a host computer, a method of providing service to virtual machines, said method comprising:
providing a service by a first service virtual machine to a protected virtual machine over a first communication channel, said first service virtual machine and said protected virtual machine executing within a hypervisor of said host computer;

detecting, by said first service virtual machine, an anomaly in said service provided to said protected virtual machine;

informing a management module executing upon said host computer of said anomaly;

instructing said protected virtual machine by said management module to switch from said first communication channel to a second communication channel, wherein said first service virtual machine not being able to communicate with said protected virtual machine over said second communication channel; and providing said service by a second service virtual machine to said protected virtual machine over said second communication channel, said second service virtual machine executing within said hypervisor of said host computer.

2. The method as recited in claim 1 further comprising:
switching said protected virtual machine from said first communication channel to said second communication channel by modifying a configuration file of said protected virtual machine.

3. The method as recited in claim 1 further comprising:
switching said protected virtual machine from said first communication channel to said second communication channel by modifying a configuration file.

4. The method as recited in claim 1 further comprising:
monitoring traffic of said protected virtual machine over said first communication channel by said first service virtual machine via a hooking point in said hypervisor.

5. The method as recited in claim 1 further comprising:
providing said service by said second service virtual machine to a second protected virtual machine over said second communication channel, said second protected virtual machine executing within said hypervisor of said host computer.

6. A method as recited in claim 1 wherein said anomaly in said service is that said first service virtual machine or said first communication channel has failed.

7. A method as recited in claim 1 wherein said first and second communication channels are implemented using said hypervisor.

8. A method executed by software instructions stored in at least one hardware computing system of providing service to virtual machines, said method comprising:
providing a service by a first service virtual machine to a protected virtual machine over a first communication channel, said first service virtual machine and said protected virtual machine executing within a first hypervisor of a first host computer;

detecting an anomaly in said service provided to said protected virtual machine;

informing a management module of said anomaly;

instructing said protected virtual machine by said management module to switch from said first communication channel to a second communication channel, wherein said first service virtual machine not being able to communicate with said protected virtual machine over said second communication channel; and providing said service by a second service virtual machine to said protected virtual machine over said second communication channel, said second service virtual machine executing within a second hypervisor of a second host computer.

9. The method as recited in claim 8 further comprising:
switching said protected virtual machine from said communication channel to said second communication channel by modifying a configuration file of said protected virtual machine.

10. The method as recited in claim 8 further comprising:
switching said protected virtual machine from said first communication channel to said second communication channel by modifying a configuration file.

11. The method as recited in claim 8 further comprising:
monitoring traffic of said protected virtual machine over said first communication channel by said first service virtual machine via a first hooking point in said first hypervisor.

12. The method as recited in claim 8 further comprising:
monitoring traffic of said protected virtual machine over said second communication channel by said second service virtual machine via a second hooking point in said first hypervisor.

13. The method as recited in claim 12 further comprising:
monitoring said traffic via said second hooking point by using a protocol between said second host computer and said first host computer.

14. A method as recited in claim 8 wherein said anomaly in said service is that said first service virtual machine or said first communication channel has failed.

15. A method as recited in claim 8 wherein said first and second communication channels are implemented using said first hypervisor.

* * * * *